Patented Sept. 25, 1934

1,974,474

UNITED STATES PATENT OFFICE 1,974,474

VEGETABLE FOOD PRODUCT AND DESSERT PREPARATION

Hyman Sher, New York, N. Y.

No Drawing. Application March 3, 1933,
Serial No. 659,591

10 Claims. (Cl. 99—11)

My invention relates to a method of making food product in the nature of a dessert and to a dry preparation useful in preparing the same.

It is contemplated as an object of my invention to provide a preparation, preferably marketable in a dry form, useful in preparing food products or desserts in the nature of a gelatine preparation. It is contemplated by my invention to provide a preparation of the character referred to which will avoid the use of animal gelatins in that these products are objectionable to individuals who may be restricted in the use of protein diets, and further, to provide a product which may be used in full compliance with the Hebrew dietary laws.

The low protein or non-nitrogenous food products which are known to me which comply with the Hebrew dietary laws and which have been used to some extent in the preparation of a food product in the nature of a gelatine dessert comprise vegetable gums, such as agar agar and sea weed and to a certain extent, generally gums derived from marine plants. In the preparation of food products or desserts simulating gelatine desserts, using vegetable gums, such as sea weed and particularly agar agar, where such products were attempted to be used in marketable preparations constituting in addition to agar agar, sea weed and similar vegetable gums, the palatable constituents, such as sugar, fruit acid and flavoring have been incapable of use, as in the presence of the flavoring ingredients such as edible acids, the agar agar would fail completely in exhibiting any coagulating properties, when made from a prepared batch as is the case with gelatine preparations. Thus, where agar agar has been attempted to be sold in pulverulent form, with the requisite quantity of sugar and flavoring ingredients, such as fruit or edible food acids, any attempt to form a stiffened, gelatine like substance has completely failed.

It is therefore contemplated as an object of my invention to provide a preparation which may be marketed in a dry form, constituting vegetable gums and gum products of low or non-protein content derived from marine plants, such as sea weed and particularly agar agar. Such preparations may be distributed, retained in storage for prolonged periods of time and may be used in the preparation of food products in the nature of a gelatine dessert, with the same facility and ease now experienced with animal gelatine preparations.

While in the preparation hereinafter referred to, vegetable gums such as sea weed and agar agar are enumerated, in exemplifying my invention, reference will be made to agar agar as this is the preferred form of my product and constitutes the primary constituent.

In the preparation of a food product as contemplated by me, pulverized, coagulable material as is the vegetable gum mentioned fruit acids or edible food acids such as tartaric or citric acid, and in some instances, sugar, where a sweetening agent is desired, are substantially the essential ingredients, to which boiling water only need be added in the final preparation of such product. Where it has been attempted to utilize agar agar as the material which gives body gelling and coagulating properties, to form a stiff, elastic food preparation, the presence of the dry acid used has rendered such preparations inoperative and where agar agar is first admixed with dry acids, upon addition of this preparation to the requisite quantity of water, coagulation, gelling and stiffening do not occur. I have found that a dry marketable product may be made in which agar agar, dry acids, with or without sugar and flavoring constituents are ingredients, and which may be prepared, by mixing with such preparation, innocuous, gas forming, preferably alkaline, salts. Thus, I have found that if in addition to the presence of the edible acids, such as tartaric or citric acid, there are combined dry alkaline gas forming salts, such as sodium bicarbonate, ammonium bicarbonate or any of the alkali metal bicarbonates, that agar agar, and to certain extent vegetable gums, and gums derived from marine plants, such as sea weed, may be prepared in dry pulverulent form, together with flavoring constituents, coloring or sugar, to provide a single marketable preparation. Such preparation may be directly added to water to form a desirable food product in the nature of a dessert or a substitute for animal gelatine.

The constituents entering into my preparation in the preferred form, are as follows:

Pulverized agar agar _____ $\frac{1}{16}$ oz.
Sugar _____ 1¾ oz.
Dry acid, such as tartaric or citric _____ $\frac{1}{16}$ oz.
Fruit flavoring _____ 10 drops
Sodium bicarbonate _____ 3 grains
Certified coloring _____ ½ grain This preparation, intimately admixed, may be set up into packages and will keep indefinitely. When it is desired to be used, all these ingredients as above mentioned are added to approximately eight ounces of water, to dissolve the same.

The admixture is then brought to a boil and allowed to cool and set. Room temperatures are sufficient for this purpose and setting will occur in about 20 to 25 minutes.

Figured in parts by weight for making about 158 pounds of a batch, using about 128 parts of water, the ingredients are as follows:

| | |
|---|---|
| Agar agar | 1 part |
| Sugar | 28 parts |
| Dry acid | 1 part |
| Flavoring | .3 part |
| Sodium bicarbonate | .1 part |
| Coloring | .02 part |

Where it is desired to prepare the product into any particular form before coagulation sets in, the dissolved and boiled product may be poured into forms and allowed to set therein, in a manner in which ordinary animal gelatine preparations are used.

Upon cooling, the requisite stiffness will be found and the product will, upon removal from the form, retain its shape and elastic stiffness, characteristic of animal gelatine products.

While the above dry preparation may be packed in moistureproof packages for prolonged periods of time without alteration, I prefer, especially to enhance the keeping qualities of the preparation, to first intimately mix with the dry acids used, some innocuous coating material which will retard the activity of the acids, particularly in humid climates. Such coating materials which I have found suitable are finely pulverized arrowroot or ordinary starch. I have found it desirable to add equal parts of acid and the coating material, preferably arrowroot. The acid, prepared as just described, may then be added to the other dry constituents, to form my marketable dry preparation.

In general, I have found where using the acids aforementioned and the alkaline salt, preferably the alkaline gas forming salt in the form of sodium bicarbonate, that one tenth the quantity of bicarbonate to the acid will give the most desirable results. I may, however, use in the formula first given as low as one thirty second ounce of citric or tartaric acid or as high as one quarter ounce of the acid and as low as one grain of sodium bicarbonate and as high as twelve grains of sodium bicarbonate and still retain desirable results.

In distinguishing my food product, it is to be observed that the preparation in use provides a coagulating or gelling preparation in which sugar as a constituent in the preferred form well below such quantities as may form concentrated sugar solutions and my preparation is not to be confused with preserves, jellies or jam which utilize concentrated sugar solutions, or in which the sugar content is well over 60%. In my product the essential coagulating or gelling constituent characterizes the product as a food or dessert rather than the aforementioned products, preserves or jams.

It will be observed that in general, my invention is applicable to the production of a food product in the nature of a dessert or a product adapted to be used instead of animal gelatine preparations and that novelty is attributed in making such products, utilizing low or non-nitrogenous gums, such as sea weed, and preferably agar agar, in which, with the necessary water content for making a batch, the sugar is in relative low proportions and well below that which would form concentrated sugar solutions, and in such preparations, I consider the novelty of my invention to reside in the addition of the alkaline agent or alkaline gas forming agent, as described, preferably present in percentages of from six to ten per cent of the quantity of edible acid that is used, but it is understood that the quantity of such alkaline or gas forming salt may be lower than the range stated and even below three per cent of the edible acid or higher than ten per cent and as high as forty per cent of the edible acid. However, these percentages are not as desirable as the preferred range previously mentioned.

While I believe that it is the alkaline, gas forming properties of the salts that I have described which make it possible for the preparation I have described to form a stiffened, gelled or coagulated product and which, were these ingredients not present, when utilizing an edible acid, would result in failure, I consider the broader phase of my invention to include, in connection with gums of the character referred to, having present an edible acid, the use of an ingredient which inhibits the anti-coagulating action of the acid which, for purposes of convenience, I have referred to as an "acid inhibiting agent".

Having thus described my invention and illustrated its use, what I claim as new and desire to secure by Letters Patent, is—

1. A dry preparation adapted to form, with about eight ounces of water, a stiff gelled food product comprising agar agar one sixteenth ounce; sugar about one and three quarter ounces, edible acid about one sixteenth ounce and sodium bicarbonate about three grains.

2. A dry preparation adapted to form with water a stiffened, gelled product comprising one part agar agar, twenty eight parts sugar, one part dry edible acid and sodium bicarbonate constituting six to ten per cent of the acid.

3. A dry preparation adapted to be added to an aqueous medium to form therewith a stiffened gelled product comprising agar agar, together with a dry edible acid and an acid inhibiting agent consisting of an alkaline salt.

4. A dry preparation adapted to be added to an aqueous medium to form therewith a stiffened gelled product comprising agar agar, together with a dry edible acid and an acid inhibiting agent, said acid inhibiting agent comprising an alkaline gas forming salt.

5. A dry preparation adapted to be added to an aqueous medium to form therewith a stiffened gelled product comprising agar agar, together with a dry edible acid and an acid inhibiting agent, said acid inhibiting agent comprising an alkaline gas forming salt, said edible acid including a minute coating of arrowroot.

6. The herein described coagulated or gelled food or dessert product, comprising water, agar-agar, sugar and the reaction product of an edible acid and an alkaline salt.

7. The herein described coagulated or gelled food or dessert product in the proportions comprising approximately eight ounces of water, approximately $\frac{1}{16}$ ounces agar-agar on a dry basis, sugar approximately 1¾ ounces, and the reaction product derived from $\frac{1}{32}$ to ¼ ounce edible acid and from 1 grain to 12 grains of sodium bicarbonate.

8. The herein described coagulated or gelled food or dessert product in the proportions comprising approximately eight ounces of water, approximately $\frac{1}{16}$ ounce agar-agar on a dry basis, sugar approximately 1¾ ounces, and the reaction product derived from a dry edible acid 1/16 ounce and an alkaline gas forming salt three grains.

9. The method of forming the herein described coagulated or gelled food or dessert product of agar-agar, water, sugar and an edible acid by dissolving the same in the water component and dissolving an alkaline salt therein in the presence of the acid content, heating such mixture and then permitting the same to set to room temperatures.

10. The method of forming the herein described coagulated or gelled food or dessert product of agar-agar, water, sugar and an edible acid by dissolving the same in the water component and dissolving an alkaline gas forming salt therein in the presence of acid content, heating such mixture and then permitting the same to set to room temperatures.

HYMAN SHER.